United States Patent
Suzuki et al.

(10) Patent No.: US 8,531,537 B2
(45) Date of Patent: Sep. 10, 2013

(54) IMAGING APPARATUS FOR PROCESSING STILL PICTURE SIGNALS AND LIVE VIEW SIGNALS OUTPUT FROM AN IMAGE SENSOR

(75) Inventors: Shunsuke Suzuki, Tokyo (JP); Hideki Kato, Tokyo (JP)

(73) Assignee: Olympus Corporation, Tokyo (JP)

( * ) Notice: Subject to any disclaimer, the term of this patent is extended or adjusted under 35 U.S.C. 154(b) by 361 days.

(21) Appl. No.: 12/877,438

(22) Filed: Sep. 8, 2010

(65) Prior Publication Data

US 2012/0057038 A1    Mar. 8, 2012

(51) Int. Cl.
*H04N 5/225* (2006.01)
*H04N 5/235* (2006.01)

(52) U.S. Cl.
USPC ............... 348/220.1; 348/221.1; 348/297

(58) Field of Classification Search
USPC .................................. 348/220.1–221.1
See application file for complete search history.

(56) References Cited

U.S. PATENT DOCUMENTS

| | | | | |
|---|---|---|---|---|
| 7,667,756 | B2* | 2/2010 | Suzuki | 348/312 |
| 7,692,690 | B2* | 4/2010 | Honma | 348/220.1 |
| 7,989,745 | B2* | 8/2011 | Suzuki | 250/201.2 |
| 8,130,279 | B2* | 3/2012 | Masaki | 348/220.1 |
| 8,174,590 | B2* | 5/2012 | Honda et al. | 348/241 |
| 8,411,157 | B2* | 4/2013 | Gomi et al. | 348/220.1 |
| 2009/0213237 | A1* | 8/2009 | Ishida | 348/221.1 |
| 2012/0182455 | A1* | 7/2012 | Gomi et al. | 348/311 |
| 2012/0320231 | A1* | 12/2012 | Suito | 348/222.1 |

FOREIGN PATENT DOCUMENTS

| | | | |
|---|---|---|---|
| JP | 2005-277513 A | 10/2005 | |
| JP | 2009-171161 A | 7/2009 | |

\* cited by examiner

*Primary Examiner* — Ngoc-Yen Vu
(74) *Attorney, Agent, or Firm* — Westerman, Hattori, Daniels & Adrian, LLP

(57) ABSTRACT

An imaging apparatus includes a readout unit that reads still picture signals from first pixels among a plurality of pixels disposed on an imaging device and reads motion picture signals from second pixels among the plurality of pixels at predetermined frame cycles, and a readout control unit that controls the readout timings of the still picture signals based on the length of a still picture exposure period for accumulating the still picture signals and the length of a motion picture frame cycle period which is the period of the frame cycles.

2 Claims, 10 Drawing Sheets

IMAGING APPARATUS FOR PROCESSING STILL PICTURE SIGNALS AND LIVE VIEW SIGNALS OUTPUT FROM AN IMAGE SENSOR

BACKGROUND OF THE INVENTION

1. Field of the Invention

The present invention relates to an imaging apparatus, a readout control method, a program product, a readout control apparatus, and a solid-state imaging device.

2. Description of the Related Art

In the related art, an imaging apparatus, during an exposure period at the time of capturing a still picture, is unable to acquire images (hereinafter referred to as live view images) of a through-motion picture (hereinafter referred to as live view motion picture) which is displayed on a back LCD screen. In that case, the live view display enters a blackout state, or an image captured right before that instance is displayed as a still picture.

As a configuration of a general image sensor, a configuration shown in FIG. 10 is known. In the example shown, an image sensor 100 includes a pixel unit 600, a vertical scanning circuit 601, a horizontal readout circuit 602, and an amplification unit 603. The pixel unit 600 includes a plurality of pixels. The plurality of pixels is disposed in the pixel unit 600 in a 2-dimensional array of m rows by n columns. The vertical scanning circuit 601 performs drive control of pixels in row units. The horizontal readout circuit 602 inputs one row of pixel signals selected by the vertical scanning circuit 601 to the amplification unit 603 in a time-sequential manner in the order of arrangement in the horizontal direction. The amplification unit 603 amplifies the input pixel signals and outputs the signals through an output unit 604. A method of selecting and reading the pixel signals of each row sequentially from the first row to the m-th row with such a configuration, thus reading the entire pixel signals, is referred to as an XY address readout method.

Moreover, in an imaging apparatus, when the operation mode is switched to an AE (Automatic Exposure) mode or an AF (Autofocus) mode, the continuity of signals or the continuity of display on an EVF (Electronic View Finder) is lost. As a method for solving this problem, a method of compensating for the loss of signal continuity using a method such as block readout method is disclosed in JP-A-2009-171161 and JP-A-2005-277513.

Moreover, there is known a technique in which still picture pixels and live view pixels are provided separately, and which has a configuration for reading signals from the still picture pixels and a configuration for reading signals from the live view pixels, thus enabling the live view display to be updated during acquisition of the still picture signals.

SUMMARY OF THE INVENTION

An imaging apparatus according to an aspect of the present invention includes: a readout unit that reads still picture signals from first pixels among a plurality of pixels disposed on an imaging device and reads motion picture signals from second pixels among the plurality of pixels at predetermined frame cycles; and a readout control unit that controls the readout timings of the still picture signals based on the length of a still picture exposure period for accumulating the still picture signals and the length of a motion picture frame cycle period which is the period of the frame cycles.

A readout control method according to an aspect of the present invention includes: a readout step of reading still picture signals from first pixels among a plurality of pixels disposed on an imaging device and reading motion picture signals from second pixels among the plurality of pixels at predetermined frame cycles; and a readout control step of controlling the readout timings of the still picture signals based on the length of a still picture exposure period for accumulating the still picture signals and the length of a motion picture frame cycle period which is the period of the frame cycles.

A program product according to an aspect of the present invention has a program recorded therein, the program causing a computer to execute: a readout step of reading still picture signals from first pixels among a plurality of pixels disposed on an imaging device and reading motion picture signals from second pixels among the plurality of pixels at predetermined frame cycles; and a readout control step of controlling the readout timings of the still picture signals based on the length of a still picture exposure period for accumulating the still picture signals and the length of a motion picture frame cycle period which is the period of the frame cycles.

A readout control apparatus according to an aspect of the present invention includes: a readout unit that reads still picture signals from first pixels among a plurality of pixels disposed on an imaging device and reads motion picture signals from second pixels among the plurality of pixels at predetermined frame cycles; and a readout control unit that controls the readout timings of the still picture signals based on the length of a still picture exposure period for accumulating the still picture signals and the length of a motion picture frame cycle period which is the period of the frame cycles.

A solid-state imaging device according to an aspect of the present invention includes: a plurality of pixels disposed on an imaging device; a readout unit that reads still picture signals from first pixels among the plurality of pixels and reads motion picture signals from second pixels among the plurality of pixels at predetermined frame cycles; and a readout control unit that controls the readout timings of the still picture signals based on the length of a still picture exposure period for accumulating the still picture signals and the length of a motion picture frame cycle period which is the period of the frame cycles.

DETAILED DESCRIPTION OF THE INVENTION

In the related art, an imaging apparatus is known which includes a configuration for reading signals from still picture pixels and a configuration for reading signals from live view pixels by dividing pixels into the still picture pixels and the live view pixels, thus enabling the live view display to be updated during acquisition of still picture signals. However, in the known imaging apparatus, since the still picture pixels and the live view pixels are provided separately, control of the pixels is complicated. Thus, the processing of signals output from the sensor is highly likely to be complicated. Specifically, if the exposure periods of still pictures are different, the signal readout start timings of the still pictures are also greatly different. Therefore, the control of reading signals from the still picture pixels and the live view pixels and the control of processing the read signals are made complicated.

The imaging apparatus of the present embodiment is made in view of the above problems and is able to simplify the processing of the still picture signals and the live view signals output from an image sensor.

Hereinafter, an embodiment of the present invention will be described with reference to the drawings. Although the following detailed description contains many specific details for the purposes of illustration, anyone of ordinary skill in the art will appreciate that many variations and alterations to the following details are within the scope of the present invention. Accordingly, the exemplary embodiments of the present invention described below are set forth without any loss of generality to, and without imposing limitations upon, the claimed invention.

Figure 1:
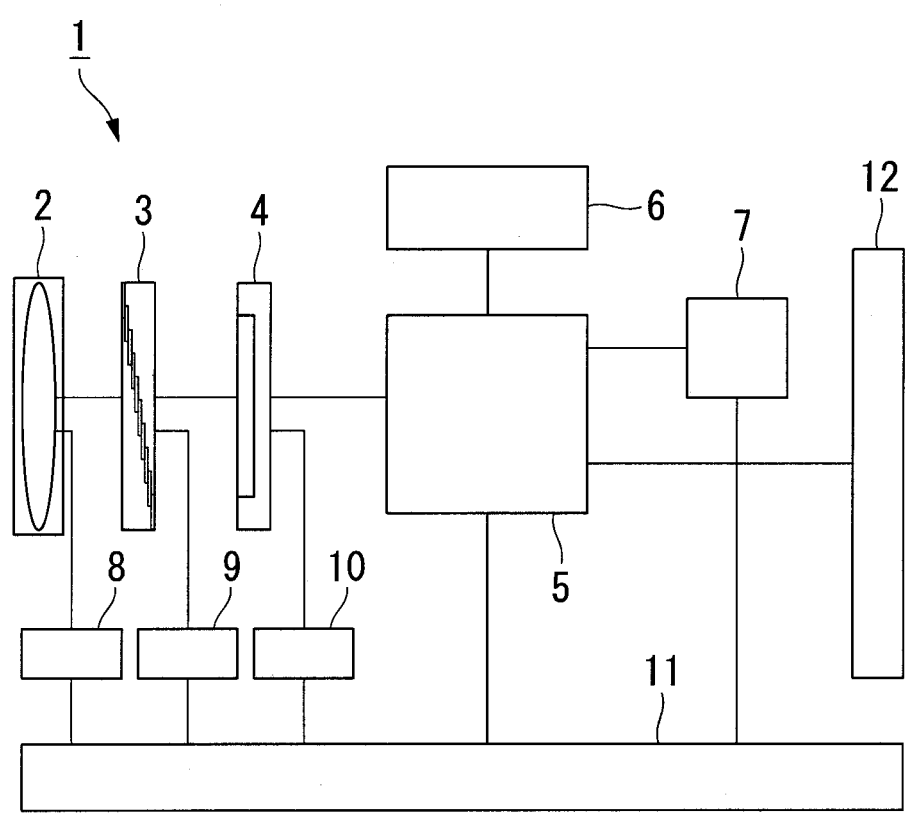
FIG. 1 is a block diagram showing a configuration of an imaging apparatus according to an embodiment of the present invention.

FIG. 1 is a block diagram showing a configuration of an imaging apparatus according to the present embodiment. An imaging apparatus 1 may be mounted on an electronic apparatus such as a digital video camera or an endoscope in addition to a digital camera. In the example shown, the imaging apparatus 1 includes an optical system 2, a mechanical shutter 3, an image sensor 4, an image processing circuit 5, a storage unit 6, a recording medium 7, an optical system control unit 8, a shutter driving unit 9, an imager driving unit 10, a camera control unit 11, and an output display unit 12. Although the recording medium 7 is included in FIG. 1, the recording medium 7 may not be a configuration inherent to the imaging apparatus 1 since it is configured to be detachable from the imaging apparatus 1. A solid-state imaging device recited in the claims corresponds to the image sensor 4, for example.

The optical system 2 includes a lens and an aperture. The lens is an imaging lens for imaging an optical image of a subject on an imaging plane of the image sensor 4. The aperture is a mechanism for controlling the amount of light incident from the lens to the image sensor 4. The mechanical shutter 3 controls the optical image of the subject to be incident to the image sensor 4 only during exposure using a physical configuration. The image sensor 4 photoelectrically converts the optical image of the subject imaged by the lens to digital signals and outputs the signals as image signals. The image processing circuit 5 performs various types of digital image processing on the image signals output from the image sensor 4.

The storage unit 6 stores data used by each unit of the imaging apparatus 1. The recording medium 7 stores the image signals processed for recording by the image processing circuit 5. The optical system control unit 8 controls the position (focus position) of the aperture or the lens based on an instruction from the camera control unit 11. The shutter driving unit 9 controls the opening/closing of the mechanical shutter 3 based on an instruction from the camera control unit 11. The imager driving unit 10 controls the operation of the image sensor 4 based on an instruction from the camera control unit 11. The camera control unit 11 controls each unit of the imaging apparatus 1. The output display unit 12 displays images based on the image signals processed for display by the image processing circuit 5.

In the embodiment described below, it is assumed that the mechanical shutter 3 maintains an open state.

Figure 2:
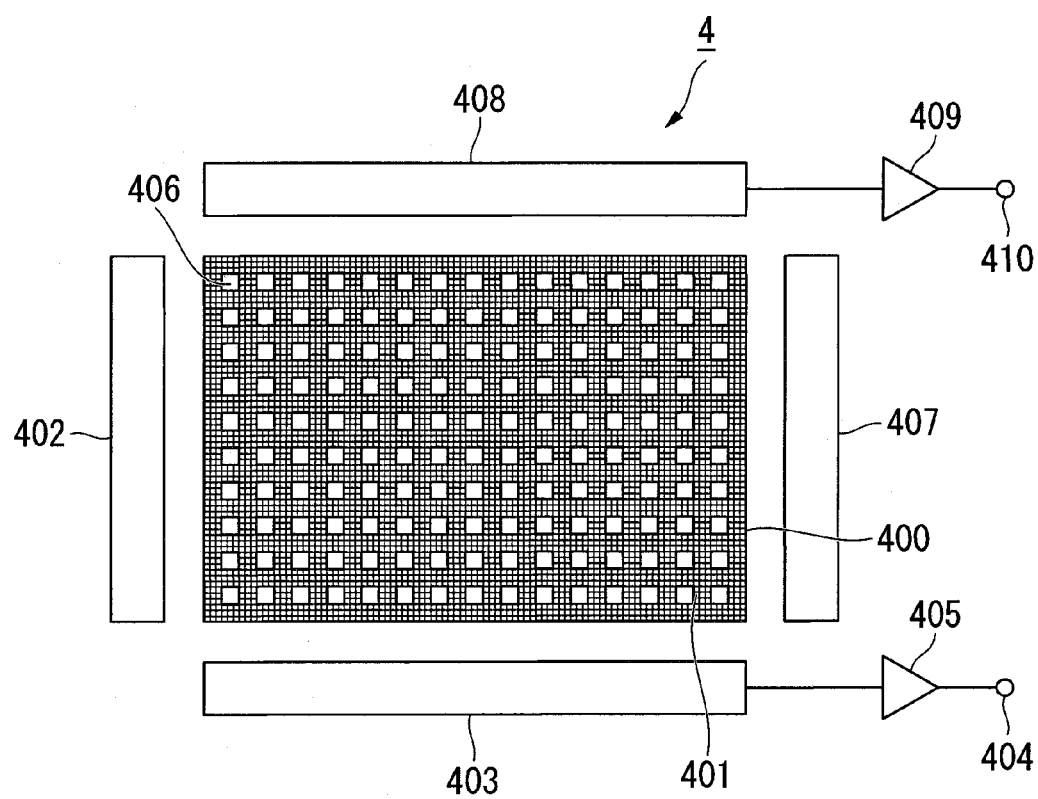
FIG. 2 is a schematic diagram showing a configuration of an image sensor according to the present embodiment.

Next, the configuration of the image sensor 4 will be described. FIG. 2 is a schematic diagram showing the configuration of the image sensor 4 according to the present embodiment. In the example shown, the image sensor 4 includes a pixel unit 400, a still picture vertical scanning circuit 402, a still picture horizontal readout circuit 403, a still picture amplification unit 404, a still picture output unit 405, a live view vertical scanning circuit 407, a live view horizontal readout circuit 408, a live view amplification unit 409, and a live view output unit 410.

The blocks shown herein can be implemented with hardware components such as a CPU or a memory in a computer and software components such as a computer program. However, in the drawing, the blocks are shown as a functional block which is implemented by a collaboration of the hardware and software components. Therefore, those skilled in the art can understand that these functional blocks can be implemented in various forms by the combination of the hardware and software components.

In the pixel unit 400, a plurality of still picture pixels 401 for capturing still pictures is disposed in a 2-dimensional array of m rows by n columns. Moreover, in the pixel unit 400, a plurality of live view pixels 406 for capturing live view images is disposed between the still picture pixels 401 in a 2-dimensional array of a rows by b columns. Here, the relationship of m>a or n>b is satisfied. That is, the number of live view pixels 406 is smaller than the number of still picture pixels 401.

In addition, an imaging device recited in the claims corresponds to the pixel unit 400, for example. Moreover, a first pixel recited in the claims corresponds to the still picture pixel 401, for example. Furthermore, a second pixel recited in the claims corresponds to the live view pixel 406.

The still picture vertical scanning circuit 402 applies a signal that controls a row-based pixel operation to the still picture pixels 401 of the pixel unit 400. The still picture vertical scanning circuit 402 includes a vertical scanning circuit, a reset control unit, and a signal readout control unit. The pixel signals of the still picture pixels 401 on a row selected by the still picture vertical scanning circuit 402 are output to still picture vertical signal lines which are provided for each column. The still picture horizontal readout circuit 403 outputs the pixel signals output to the still picture vertical signal lines in a time-sequential manner in the order of arrangement in the horizontal direction. The still picture amplification unit 404 amplifies the pixel signals output by the still picture horizontal readout circuit 403. The still picture output unit 405 outputs the pixel signal amplified by the still picture amplification unit 404.

The live view vertical scanning circuit 407 applies a signal that controls a row-based pixel operation to the live view pixels 406 of the pixel unit 400. The live view vertical scanning circuit 407 includes a vertical scanning circuit, a reset control unit, and a signal readout control unit. The pixel signals of the live view pixels 406 on a row selected by the live view vertical scanning circuit 407 are output to live view vertical signal lines which are provided for each column. The live view horizontal readout circuit 408 outputs the pixel signals output to the live view vertical signal lines in a time-sequential manner in the order of arrangement in the horizontal direction. The live view amplification unit 410 amplifies the pixel signals output by the live view horizontal readout circuit 408. The live view output unit 410 outputs the pixel signal amplified by the live view amplification unit 409.

In this way, by providing the configuration for reading the pixel signals output by the still picture pixels 401 and the configuration for reading the pixel signals output by the live view pixels 406, the pixel signals output by the still picture pixels 401 and the pixel signals output by the live view pixels 406 can be read at the same time.

In addition, a readout control unit recited in the claims corresponds to the still picture vertical scanning circuit 402 and the live view vertical scanning circuit 407, for example. Moreover, a readout unit recited in the claims corresponds to the still picture horizontal readout circuit 403 and the live view horizontal readout circuit 408, for example. Furthermore, a readout control apparatus recited in the claims corresponds to an apparatus which includes the still picture vertical scanning circuit 402, the live view vertical scanning circuit 407, the still picture horizontal readout circuit 403, and the live view horizontal readout circuit 408, for example.

Next, the operation of the image sensor 4 will be described. The following description will be given in accordance with the relationship between a readout period (motion picture frame cycle) of live view signals used for generating live view images and an exposure period for capturing still pictures.

Figure 3:
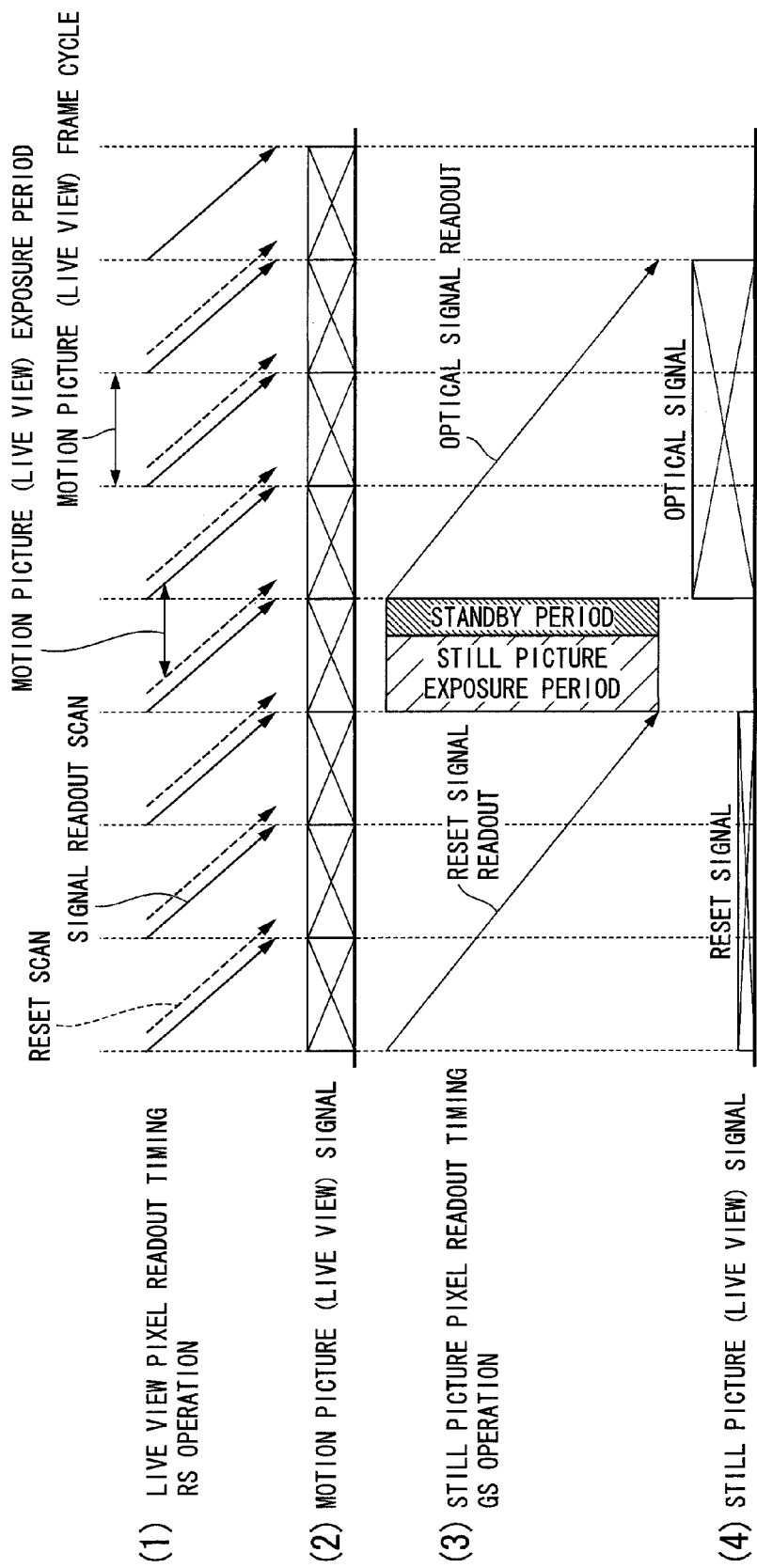
FIG. 3 is a timing chart showing the operation timings of the image sensor according to the present embodiment.

(1) When the exposure period for capturing still pictures is shorter than the readout period of live view signals used for generating live view images:

FIG. 3 is a timing chart showing the operation timings of the image sensor 4 when the exposure period for capturing still pictures is shorter than the readout period of live view signals used for generating live view images. The horizontal axis of the timing chart shown represents time.

FIG. 3(1) shows the readout timings of the pixel signals output by the live view pixels 406. FIG. 3(2) shows the acquisition timings of the live view signals. FIG. 3(3) shows the readout timings of the pixel signals output by the still picture pixels 401. FIG. 3(4) shows the acquisition timings of a reset signal and an optical signal.

In the present embodiment, the reading of the pixel signals output from the live view pixels 406 is performed by driving a rolling shutter. Moreover, the reading of the pixel signals output by the still picture pixels 401 is performed by driving a global shutter. Moreover, the reading of the pixel signals output by the live view pixels 406 involves a reset scan for resetting charges accumulated in the live view pixels 406 and a signal readout scan for reading pixel signals based on the charges accumulated in the live view pixels 406, which is performed after the reset scan. In this case, a period extending from the time of the reset scan to the time of signal readout scan corresponds to an exposure period of the pixel signals output by the live view pixels 406. That is, the period corresponds to the exposure period of the live view signals. Moreover, the reading of the pixel signals output by the still picture pixels 401 involves reading of a reset signal, which is performed before the exposure period, and reading of an optical signal, which is performed after the exposure period. In this case, a difference signal between the optical signal and the reset signal corresponds to a still picture signal used for generating the still pictures.

As shown in the drawing, the still picture vertical scanning circuit 402 and the live view vertical scanning circuit 407 control the still picture horizontal readout circuit 403 and the live view horizontal readout circuit 408 so that the timings at which the reading of the reset signal from the still picture pixels 401 starts are synchronized with the timings at which the reading of the pixel signals from the live view pixels 406 starts. Moreover, the still picture vertical scanning circuit 402 and the live view vertical scanning circuit 407 control the still picture horizontal readout circuit 403 and the live view horizontal readout circuit 408 so that the timings at which the reading of the optical signal from the still picture pixels 401 starts are synchronized with the timings at which the reading of the pixel signals from the live view pixels 406 starts.

At that time, when the exposure period for capturing the still pictures is shorter than the readout period of the live view signals used for generating the live view images, the still picture vertical scanning circuit 402 and the live view vertical scanning circuit 406 insert a standby period at the end of the exposure period for capturing the still pictures so that the timings at which the reading of the optical signal from the still picture pixels 401 starts are delayed to the timings at which the reading of the pixel signals from the live view pixels 406 starts. Moreover, the still picture vertical scanning circuit 402 and the live view vertical scanning circuit 407 remove the standby period at the same time as the start of the reading of the pixel signals from the live view pixels 406, and the reading of the optical signal from the still picture pixels 401 starts.

Here, if the length of the exposure period for capturing the still pictures is defined as T1 and the length of the motion picture frame cycle period as T2, when the exposure period for capturing the still pictures is shorter than the readout period of the live view signals used for generating the live view images, namely $(n-1) \times T2 < T1 < n \times T2$ (where n is an integer of 1 or more), the standby period is $(n \times T2 - T1)$. The example shows a case where n is 1.

By the above-described control, when the exposure period for capturing the still pictures is shorter than the readout period of the live view signals used for generating the live view images, the timings at which the reading of the optical signal from the still picture pixels 401 starts can be made identical to the timings at which the reading of the pixel signals from the live view pixels 406 starts. Therefore, it is possible to simplify the processing of the still picture signals and the live view signals output from the image sensor 4.

Moreover, in the present embodiment, since the still picture pixels 401 and the live view pixels 406 are disposed on the same pixel region, light of the same optical state is incident. Furthermore, the exposure period of the live view is generally equal to or shorter than 1/30 sec or 1/60 sec, whereas the exposure period of the still pictures ranges from 1/(several thousand) seconds to several seconds depending on a subject. Therefore, the live view signal level and the still picture signal level are substantially different in the ratio of the respective exposure periods. However, by amplifying the motion picture signals in accordance with the ratio of the exposure periods (for example, controlling the amplification factor of the live view amplification unit 409 (gain-up unit)), the difference between the live view signal level and the still picture signal level can be eliminated.

Furthermore, in the exposure period of the live view other than the exposure period of the still pictures, the aperture value of the aperture of the optical system 2 may be changed in order to eliminate the difference between the live view signal level and the still picture signal level. For example, when the exposure period of the still pictures is twice the exposure period of the live view, the optical system control unit 8 (gain-up means) controls the aperture of the optical system 2 so that the aperture value for the exposure period of the live view is one step higher than the aperture value for the exposure period of the still pictures. In addition, the difference between the live view signal level and the still picture signal level may be eliminated by using a combination of the amplification control of the live view signals and the aperture value control of the aperture of the optical system 2.

Figure 4:
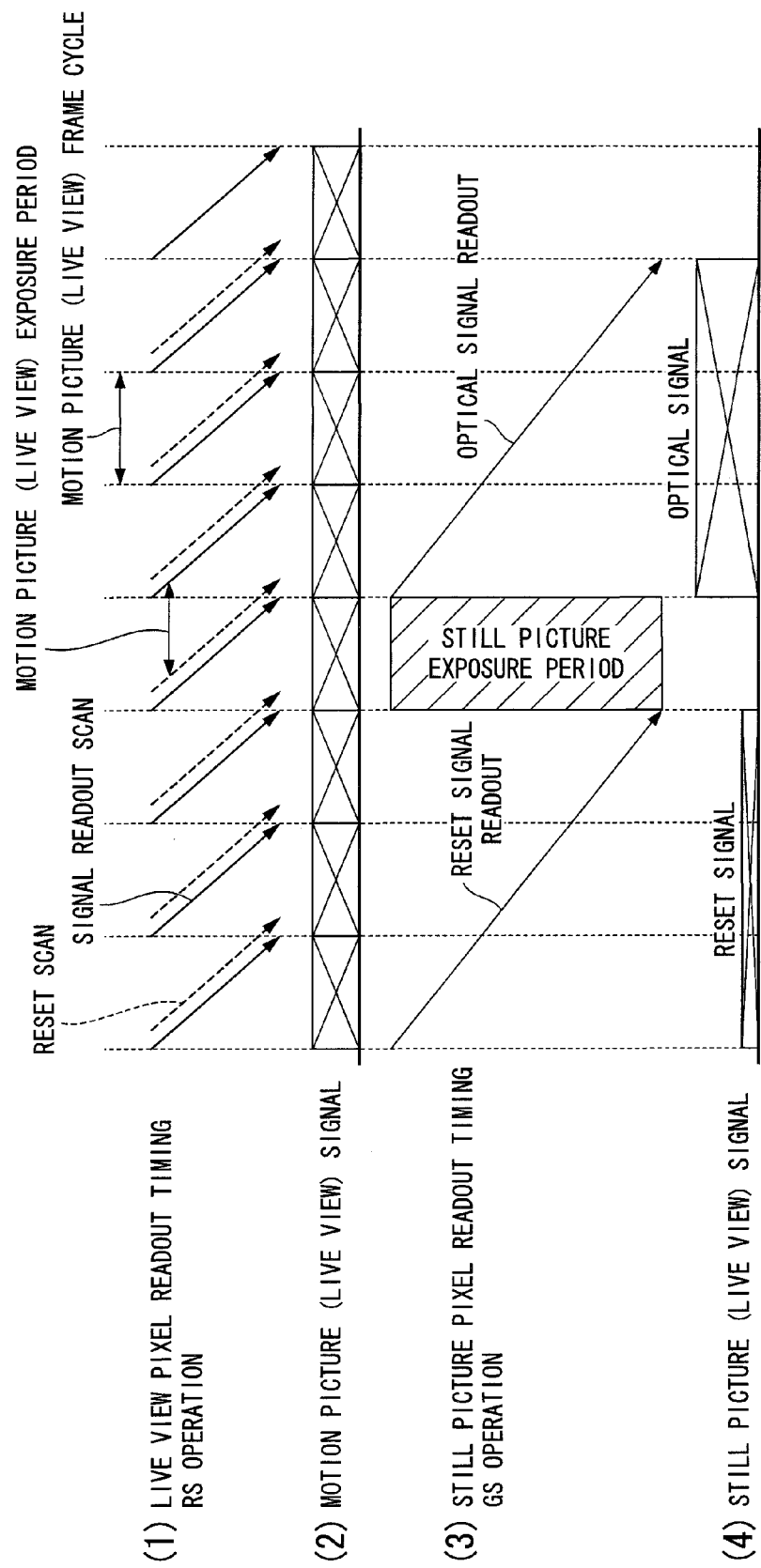
FIG. 4 is a timing chart showing the operation timings of the image sensor according to the present embodiment.

(2) When the exposure period for capturing the still pictures is an integer multiple of the readout period of the live view signals used for generating the live view images:

FIG. 4 is a timing chart showing the operation timings of the image sensor 4 when the exposure period for capturing the still pictures is once the readout period of the live view signals used for generating the live view images. The horizontal axis of the timing chart shown represents time. FIG. 4(1) shows the readout timings of the pixel signals output by the live view pixels 406. FIG. 4(2) shows the acquisition timings of the live view signals. FIG. 4(3) shows the readout timings of the pixel signals output by the still picture pixels 401. FIG. 4(4) shows the acquisition timings of a reset signal and an optical signal.

Figure 5:
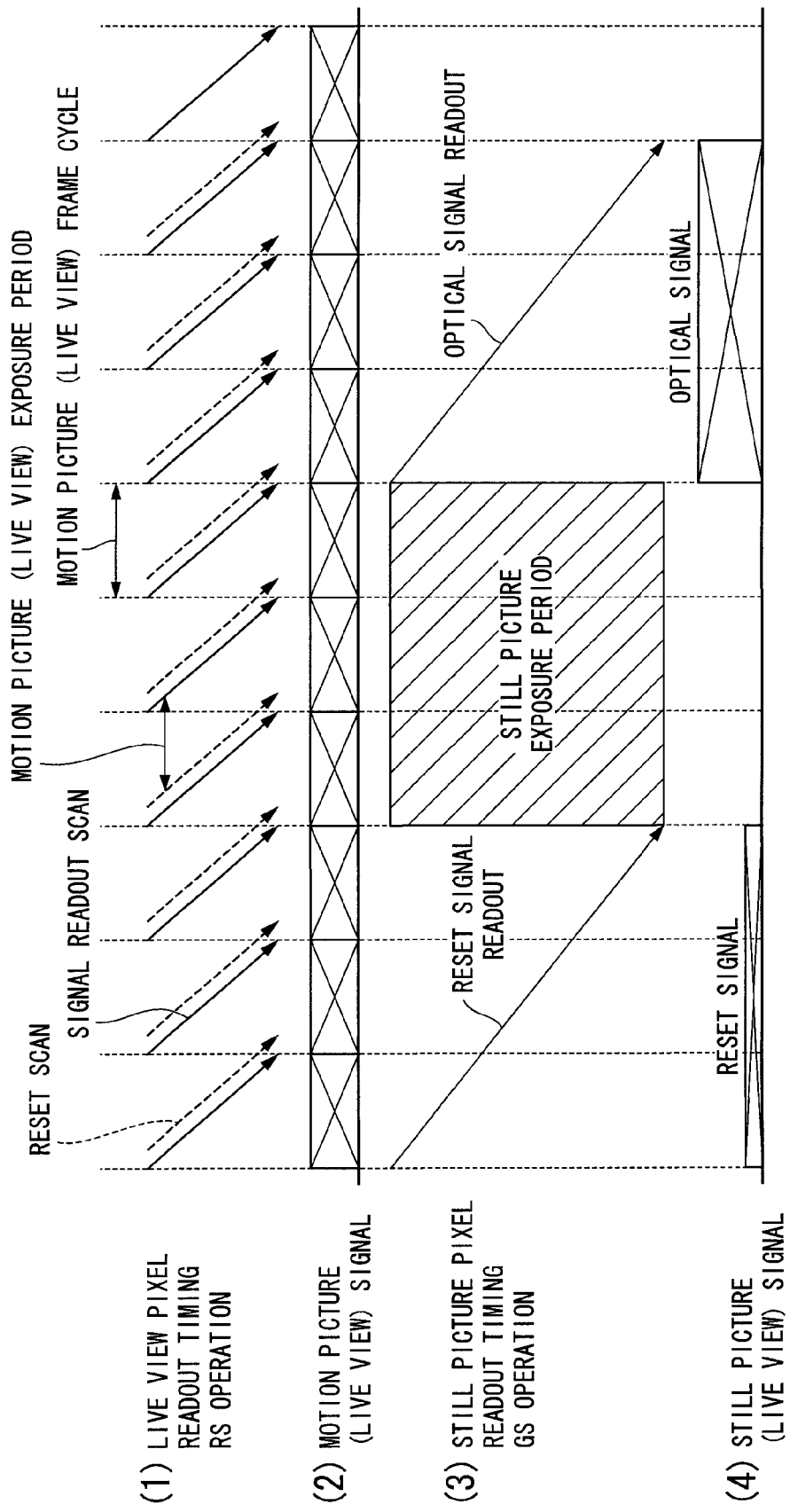
FIG. 5 is a timing chart showing the operation timings of the image sensor according to the present embodiment.

FIG. 5 is a timing chart showing the operation timings of the image sensor 4 when the exposure period for capturing the still pictures is three times the readout period of the live view signals used for generating the live view images. The horizontal axis of the timing chart shown represents time. FIG. 5(1) shows the readout timings of the pixel signals output by the live view pixels 406. FIG. 5(2) shows the acquisition timings of the live view signals. FIG. 5(3) shows the readout timings of the pixel signals output by the still picture pixels 401. FIG. 5(4) shows the acquisition timings of a reset signal and an optical signal.

As shown in FIGS. 4 and 5, the still picture vertical scanning circuit 402 and the live view vertical scanning circuit 407 control the still picture horizontal readout circuit 403 and the live view horizontal readout circuit 408 so that the timings at which the reading of the reset signal from the still picture pixels 401 starts are synchronized with the timings at which the reading of the pixel signals from the live view pixels 406 starts.

Here, if the length of the exposure period for capturing the still pictures is defined as T1 and the length of the motion picture frame cycle period as T2, when the exposure period for capturing the still pictures is an integer multiple of the readout period of the live view signals used for generating the live view images, a relationship of T1=n×T2 is satisfied (where n is an integer of 1 or more).

When the exposure period for capturing the still pictures is an integer multiple of the readout period of the live view signals used for generating the live view images, the ending time of the exposure period of the still pictures occurs at the same time as the timings at which the reading of the pixel signals from the live view pixels 406 starts. Therefore, the still picture vertical scanning circuit 402 and the live view vertical scanning circuit 407 control the still picture horizontal readout circuit 403 and the live view horizontal readout circuit 408 so that no standby period is inserted at the end of the exposure period for capturing the still pictures, and after the exposure period of the still pictures ends, the reading of the optical signal from the still picture pixels 401 starts at the same time as the start of the signal readout scan for reading the pixel signals from the live view pixels 406.

By the above-described control, when the exposure period for capturing the still pictures is an integer multiple of the readout period of the live view signals used for generating the live view images, the timings at which the reading of the optical signal from the still picture pixels 401 starts can be made identical to the timings at which the reading of the pixel signals from the live view pixels 406 starts. Therefore, it is possible to simplify the processing of the still picture signals and the live view signals output from the image sensor 4.

The difference between the live view signal level and the still picture signal level can be eliminated by the same method as the elimination method used when the exposure period for capturing the still pictures is shorter than the readout period of the live view signals.

Figure 6:
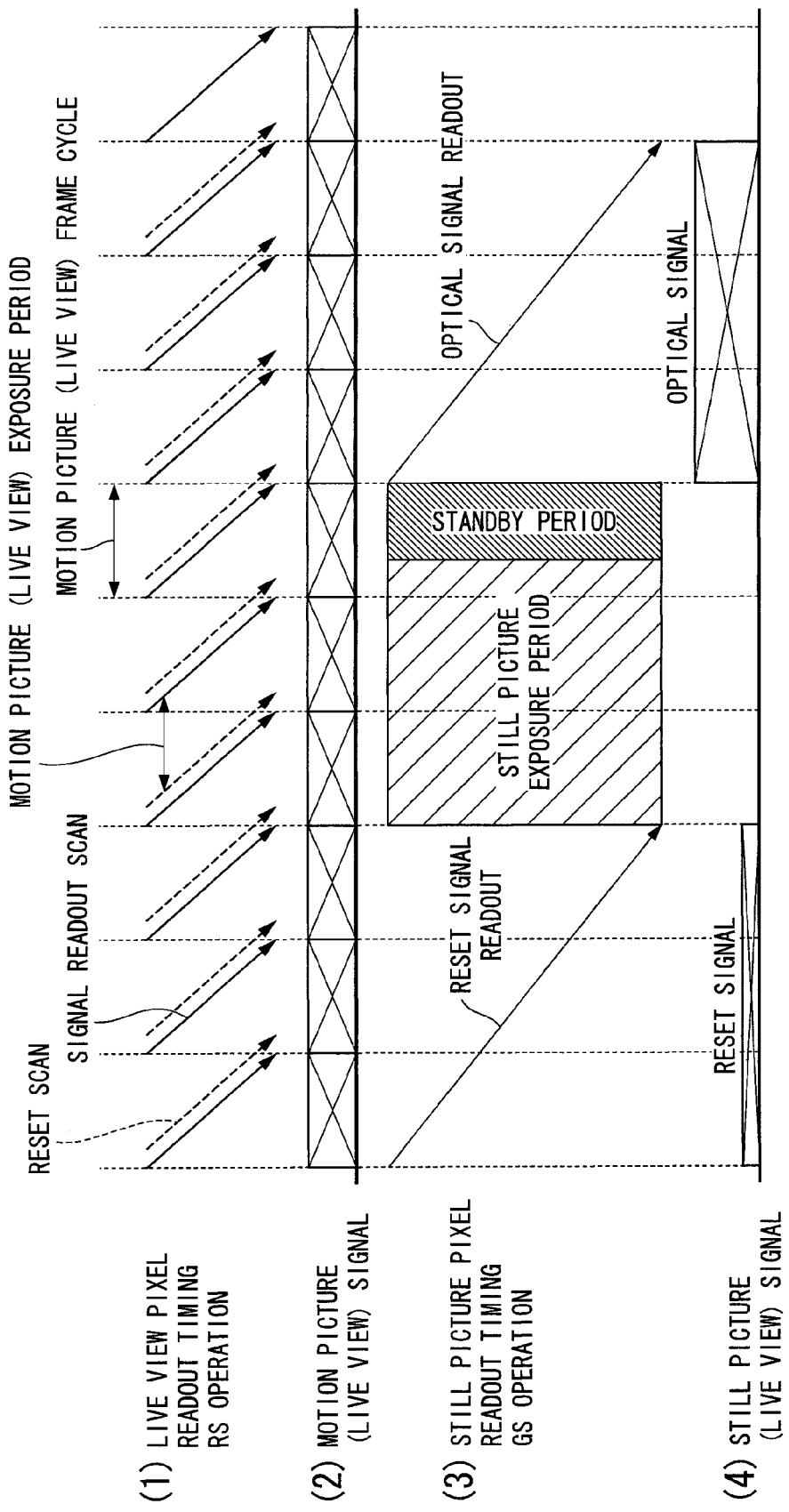
FIG. 6 is a timing chart showing the operation timings of the image sensor according to the present embodiment.

(3) When the exposure period for capturing the still pictures is longer than the readout period of the live view signals used for generating the live view images, and the exposure period for capturing the still pictures is not an integer multiple of the readout period of the live view signals used for generating the live view images:

When the exposure period for capturing the still pictures is longer than the readout period of the live view signals used for generating the live view images, and the exposure period for capturing the still pictures is not an integer multiple of the readout period of the live view signals used for generating the live view images, two control methods can be considered. One control method involves inserting the standby period at the end of the exposure period for capturing the still pictures, and the other control method involves shortening the exposure period for capturing the still pictures. FIG. 6 will be referenced regarding the control method of inserting the standby period at the end of the exposure period for capturing the still pictures, and FIG. 7 will be referenced regarding the control method of shortening the exposure period for capturing the still pictures.

FIG. 6 is a timing chart showing the operation timings of the image sensor 4 when the exposure period for capturing the still pictures is longer than the readout period of the live view signals used for generating the live view images, and the exposure period for capturing the still pictures is not an integer multiple of the readout period of the live view signals used for generating the live view images. The horizontal axis of the timing chart shown represents time.

FIG. 6(1) shows the readout timings of the pixel signals output by the live view pixels 406. FIG. 6(2) shows the acquisition timings of the live view signals. FIG. 6(3) shows the readout timings of the pixel signals output by the still picture pixels 401. FIG. 6(4) shows the acquisition timings of a reset signal and an optical signal.

As shown in the drawing, the still picture vertical scanning circuit 402 and the live view vertical scanning circuit 407 control the still picture horizontal readout circuit 403 and the live view horizontal readout circuit 408 so that the timings at which the reading of the reset signal from the still picture pixels 401 starts are synchronized with the timings at which the reading of the pixel signals from the live view pixels 406 starts. Moreover, the still picture vertical scanning circuit 402 and the live view vertical scanning circuit 407 control the still picture horizontal readout circuit 403 and the live view horizontal readout circuit 408 so that the timings at which the reading of the optical signal from the still picture pixels 401 starts are synchronized with the timings at which the reading of the pixel signals from the live view pixels 406 starts.

At that time, when the exposure period for capturing the still pictures is longer than the readout period of the live view signals used for generating the live view images, and the exposure period for capturing the still pictures is not an integer multiple of the readout period of the live view signals used for generating the live view images, a standby period is inserted at the end of the exposure period for capturing the still pictures, and the timings at which the reading of the optical signal from the still picture pixels 401 starts are delayed to the timings at which the reading of the pixel signals from the live view pixels 406 starts. Moreover, the still picture vertical scanning circuit 402 and the live view vertical scanning circuit 407 control the still picture horizontal readout circuit 403 and the live view horizontal readout circuit 408 so that the standby period is removed at the same time as the start of the reading of the pixel signals from the live view pixels 406, and the reading of the optical signal from the still picture pixels 401 starts.

Here, if the length of the exposure period for capturing the still pictures is defined as T1 and the length of the motion picture frame cycle period as T2, when the exposure period for capturing the still pictures is longer than the readout period of the live view signals used for generating the live view images, and the exposure period for capturing the still pictures is not an integer multiple of the readout period of the live view signals used for generating the live view images, namely $(n-1) \times T2 < T1 < n \times T2$ (where n is an integer of 2 or more), the standby period is $(n \times T2 - T1)$. The example shows a case where n is 3.

By the above-described control, when the exposure period for capturing the still pictures is longer than the readout period of the live view signals used for generating the live view images, and the exposure period for capturing the still pictures is not an integer multiple of the readout period of the live view signals used for generating the live view images, the timings at which the reading of the optical signal from the still picture pixels 401 starts can be made identical to the timings at which the reading of the pixel signals from the live view pixels 406 starts. Therefore, it is possible to simplify the processing of the still picture signals and the live view signals output from the image sensor 4.

Figure 7:
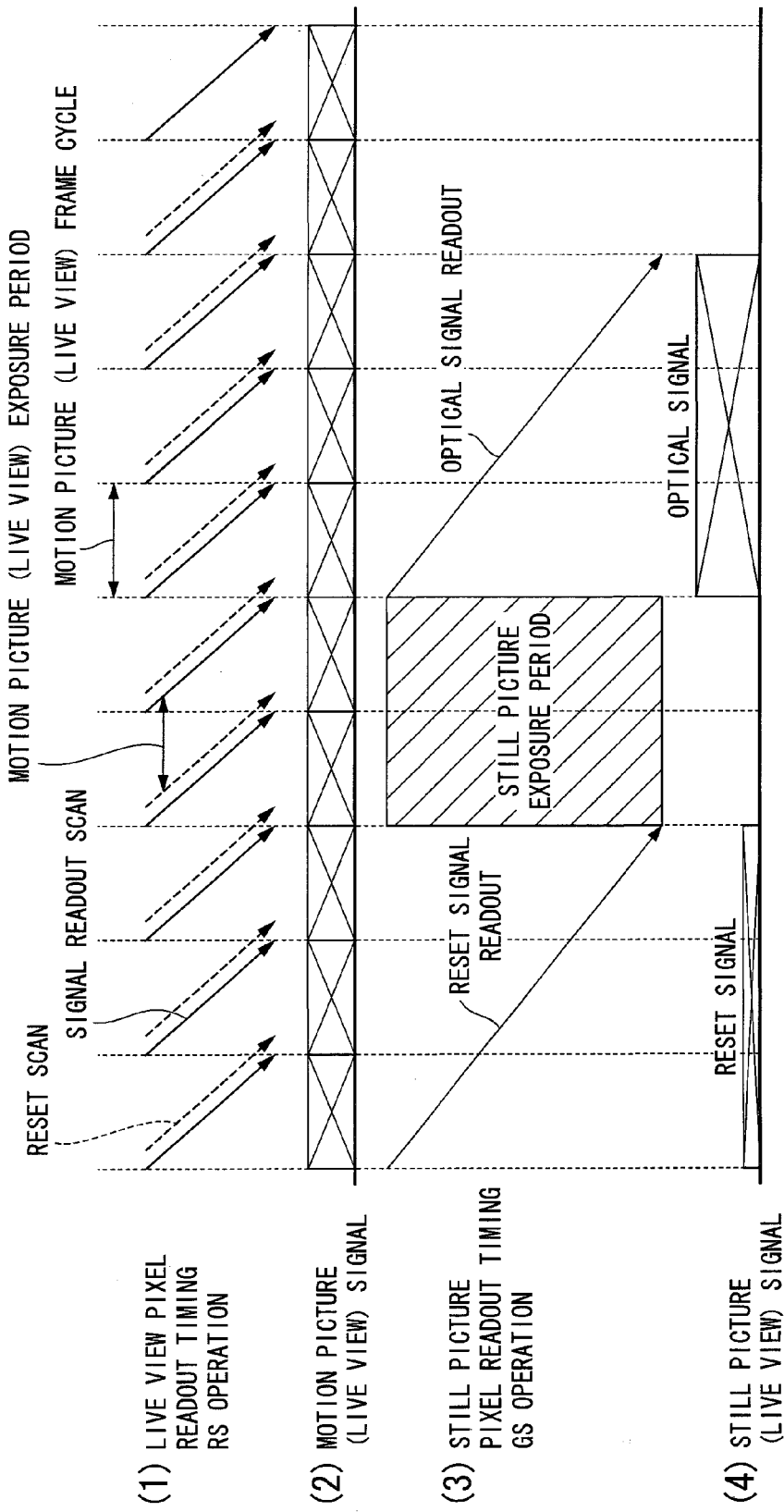
FIG. 7 is a timing chart showing the operation timings of the image sensor according to the present embodiment.

FIG. 7 is a timing chart showing the operation timings of the image sensor 4 when the exposure period for capturing the still pictures is longer than the readout period of the live view signals used for generating the live view images, and the exposure period for capturing the still pictures is not an integer multiple of the readout period of the live view signals used for generating the live view images. The horizontal axis of the timing chart shown represents time.

FIG. 7(1) shows the readout timings of the pixel signals output by the live view pixels 406. FIG. 7(2) shows the acquisition timings of the live view signals. FIG. 7(3) shows the readout timings of the pixel signals output by the still picture pixels 401. FIG. 7(4) shows the acquisition timings of a reset signal and an optical signal.

As shown in the drawing, the still picture vertical scanning circuit 402 and the live view vertical scanning circuit 407 control the still picture horizontal readout circuit 403 and the live view horizontal readout circuit 408 so that the timings at which the reading of the reset signal from the still picture pixels 401 starts are synchronized with the timings at which the reading of the pixel signals from the live view pixels 406 starts. Moreover, the still picture vertical scanning circuit 402 and the live view vertical scanning circuit 407 control the still picture horizontal readout circuit 403 and the live view horizontal readout circuit 408 so that the timings at which the reading of the optical signal from the still picture pixels 401 starts are synchronized with the timings at which the reading of the pixel signals from the live view pixels 406 starts.

At that time, when the exposure period for capturing the still pictures is longer than the readout period of the live view signals used for generating the live view images, and the exposure period for capturing the still pictures is not an integer multiple of the readout period of the live view signals used for generating the live view images, the still picture vertical scanning circuit 402 and the live view vertical scanning circuit 407 shorten the exposure period for capturing the still pictures so that the ending timings of the exposure period for capturing the still pictures occur at the same time as the timings at which the reading of the pixel signals from the live view pixels 406 starts. Moreover, the still picture vertical scanning circuit 402 and the live view vertical scanning circuit 407 control the still picture horizontal readout circuit 403 and the live view horizontal readout circuit 407 so that the reading of the optical signal from the still picture pixels 401 starts at the same time as the start of the reading of the pixel signals from the live view pixels 406.

Here, if the length of the exposure period for capturing the still pictures is defined as T1 and the length of the motion picture frame cycle period as T2, when the exposure period for capturing the still pictures is longer than the readout period of the live view signals used for generating the live view images, and the exposure period for capturing the still pictures is not an integer multiple of the readout period of the live view signals used for generating the live view images, namely $(n-1) \times T2 < T1 < n \times T2$ (where n is an integer of 2 or more), the exposure period for capturing the still pictures is $((n-1) \times T2)$. The example shows a case where n is 3.

By the above-described control, when the exposure period for capturing the still pictures is longer than the readout period of the live view signals used for generating the live view images, and the exposure period for capturing the still pictures is not an integer multiple of the readout period of the live view signals used for generating the live view images, the timings at which the reading of the optical signal from the still picture pixels 401 starts can be made identical to the timings at which the reading of the pixel signals from the live view pixels 406 starts. Therefore, it is possible to simplify the processing of the still picture signals and the live view signals output from the image sensor 4.

A user may input settings in advance as to which control method will be used among the control method of inserting the standby period at the end of the exposure period for capturing the still pictures and the control method of shortening the exposure period for capturing the still pictures. Moreover, a certain determination criterion may be provided so that the control method to be used is automatically selected by the camera control unit 11 (readout control unit).

For example, when the camera control unit 11 determines that the standby period $(n \times T2 - T1)$ calculated by the control method of inserting the standby period at the end of the exposure period for capturing the still pictures is equal to or larger than a threshold value, the control method of shortening the exposure period for capturing the still pictures is used. On the other hand, when the camera control unit 11 determines that the standby period is smaller than a threshold value, the control method of inserting the standby period at the end of the exposure period for capturing the still pictures is used.

Moreover, the value of $(T1-(n-1) \times T2)$ may be used in the determination from the relationship between the standby period $(n \times T2 - T1)$ and the motion picture frame cycle T2. Specifically, when the camera control unit 11 determines that the value of $(T1-(n-1) \times T2)$ is smaller than the threshold value, the control method of shortening the exposure period for capturing the still pictures is used. On the other hand, when the camera control unit 11 determines that the value of $(T1-(n-1) \times T2)$ is equal to or larger than the threshold value, the control method of inserting the standby period at the end of the exposure period for capturing the still pictures is used.

In addition, the threshold value may be set to a predetermined fixed value, and may be flexibly changed in accordance with a photographing environment such as temperature. From the perspective of noise of the still pictures, it is advantageous to flexibly change the threshold value in accordance with the photographing environment such as temperature.

Specifically, the charges generated by the exposure of the still picture pixels 401 are stored in the memory (charge storage unit) within the still picture pixels 401. However, the S/N ratio of the charges will deteriorate due to noise generated during the storage in the memory. When a dark current of a memory is considered as an example of the noise generated in the memory, since the noise is proportional to the standby period, the amount of noise, namely the amount of deterioration in the S/N ratio can be predicted from the standby period. Therefore, the threshold value can be changed based on the estimated amount of deterioration in the S/N ratio.

Figure 8:
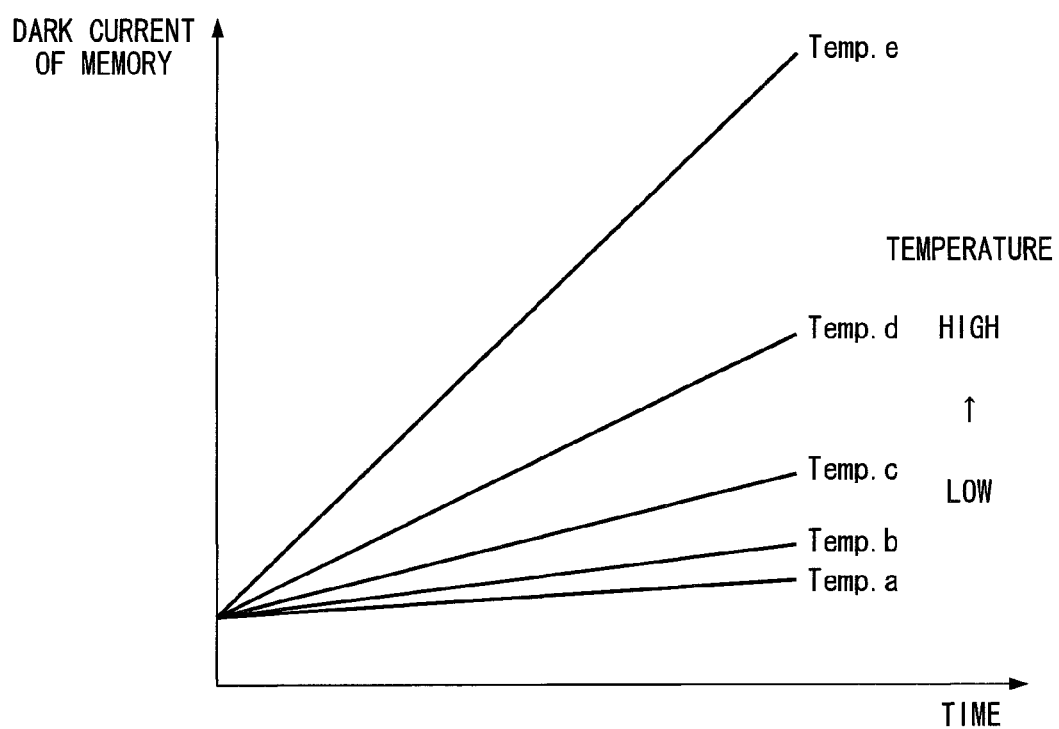
FIG. 8 is a graph showing the relationship between a standby period and a dark current of a memory when temperature is used as a parameter.

Particularly, since the dark current of a memory is temperature-dependent, by setting the threshold value with reference to temperature, the precision can be improved. FIG. 8 is a graph showing the relationship between a standby period and a dark current of a memory when temperature is used as a parameter. The horizontal axis of the graph shown represents time, and the vertical axis represents the amount of dark current of a memory. In the example shown, a case where the temperature increases in the order of Temp.a, Temp.b, Temp.c, Temp.d, and Temp.e is shown.

Figure 9:
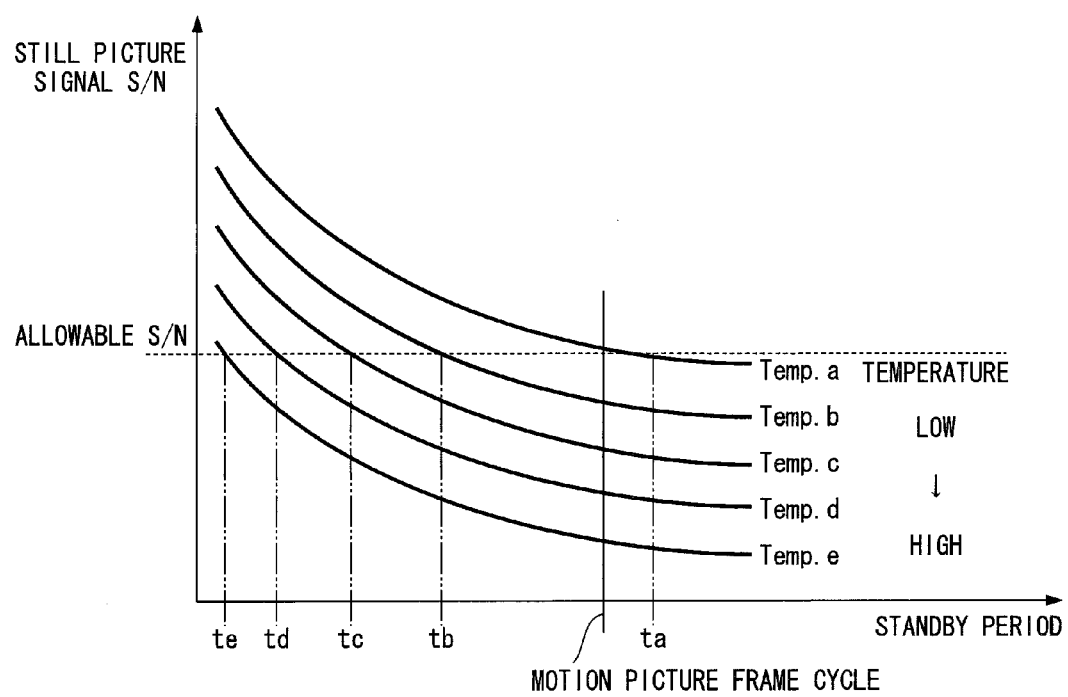
FIG. 9 is a graph showing the relationship between an S/N ratio of a still picture signal and a standby period.
Figure 10:
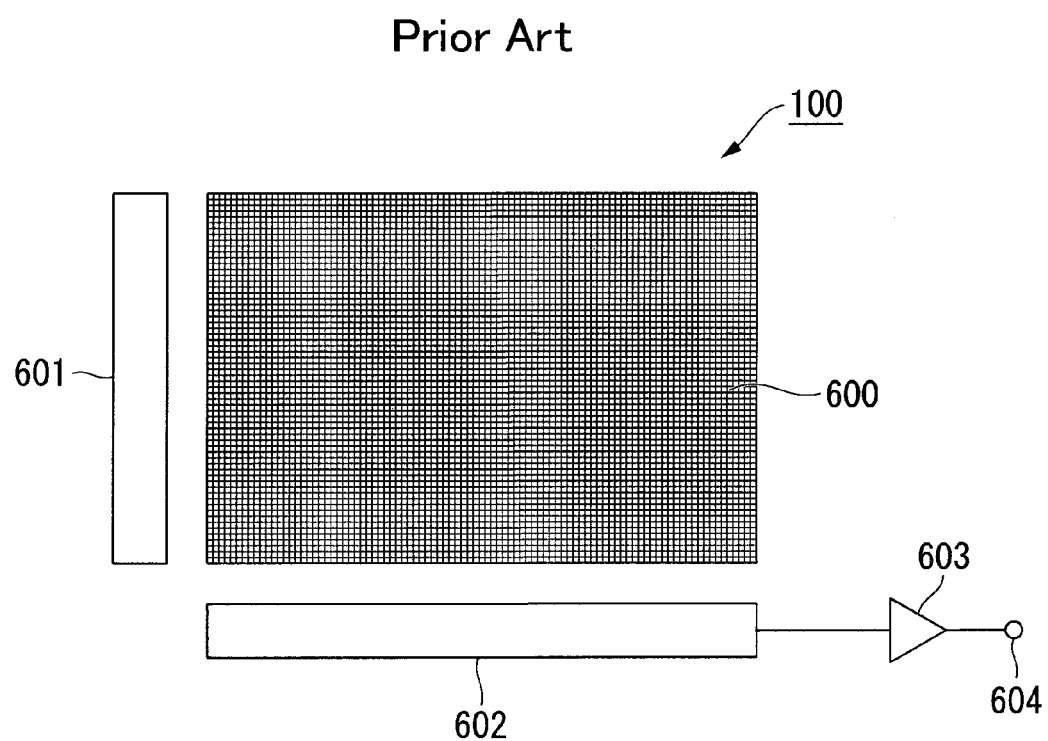
FIG. 10 is a schematic diagram showing a configuration of a known image sensor.

Moreover, since the memory noise substantially corresponds to the square root of the dark current, when temperature is used as a parameter, the relationship between the standby period and the S/N ratio of the still picture signal is given as shown in FIG. 9. FIG. 9 is a graph showing the relationship between the S/N ratio of the still picture signal and the standby period. The horizontal axis of the graph shown represents the standby period, and the vertical axis represents the S/N ratio of the still picture signal. As shown in the graph, the longer the standby period, and the higher the temperature, the lower is the S/N ratio of the still picture signal.

Therefore, an allowable level (allowable S/N level) of the S/N ratio of the still picture signal is set, and when the standby period satisfies the set allowable S/N level, the threshold value is changed so as to use the control method of inserting the standby period at the end of the exposure period for capturing the still pictures. For example, in the case of the temperature Temp.e, since the S/N ratio of the still picture signal falls below the allowable S/N level when the standby period is longer than "te," the threshold value is set to "te." Similarly, the threshold value is set to "td" for the temperature Temp.d, "tc" for the temperature Temp.c, and "tb" for the temperature Temp.b. Moreover, in the case of the temperature Temp.a, the standby period in which the S/N ratio of the still picture signal falls below the allowable S/N level is longer than the motion picture frame cycle. Therefore, in the case of the temperature Temp.a, there is no standby period in which the S/N ratio of the still picture signal falls below the allowable S/N level. Thus, in that case, it can be said that the method of inserting the standby period at the end of the exposure period for capturing the still pictures is always used.

However, when the control method of shortening the exposure period for capturing the still pictures is used, since the exposure period is shortened, the output level of the still picture signal decreases. Therefore, by amplifying the still picture signal (for example, controlling the amplification factor of the still picture amplification unit 404 (gain-up unit)) by the amount of the decrease in the output level, the still picture signal can be corrected so as to have the output level obtainable in the original exposure period. For example, when the exposure period is shortened to 80% of the normal period, the still picture signal may be amplified by a factor of 1/0.8=1.25.

By the above-described control, when the exposure period for capturing the still pictures is shorter than the readout period of the live view signals used for generating the live view images, the timings at which the reading of the optical signal from the still picture pixels 401 starts can be made identical to the timings at which the reading of the pixel signals from the live view pixels 406 starts. Therefore, it is possible to simplify the processing of the still picture signals and the live view signals output from the image sensor 4.

The difference between the live view signal level and the still picture signal level can be eliminated by the same method as the elimination method used when the exposure period for capturing the still pictures is shorter than the readout period of the live view signals.

As described above, according to the present embodiment, the timings at which the reading of the optical signal from the still picture pixels 401 starts can be made identical to the timings at which the reading of the pixel signals from the live view pixels 406 starts. Therefore, it is possible to simplify the processing of the still picture signals and the live view signals output from the image sensor 4. That is, the processing of the read still picture signals and the read live view signals can be controlled in a simple manner.

An imaging apparatus according to an aspect of the present invention may be an imaging apparatus which includes readout means for reading still picture signals from first pixels among a plurality of pixels disposed on an imaging device and reading motion picture signals from second pixels among the plurality of pixels at predetermined frame cycles, and readout control means for controlling the readout timings of the still picture signals based on the length of a still picture exposure period for accumulating the still picture signals and the length of a motion picture frame cycle period which is the period of the frame cycles.

A readout control apparatus according to an aspect of the present invention may include readout means for reading still picture signals from first pixels among a plurality of pixels disposed on an imaging device and reading motion picture signals from second pixels among the plurality of pixels at predetermined frame cycles, and readout control means for controlling the readout timings of the still picture signals based on the length of a still picture exposure period for accumulating the still picture signals and the length of a motion picture frame cycle period which is the period of the frame cycles.

A solid-state imaging device according to an aspect of the present invention may include a plurality of pixels disposed on an imaging device, readout means for reading still picture signals from first pixels among the plurality of pixels and reading motion picture signals from second pixels among the plurality of pixels at predetermined frame cycles, and readout control means for controlling the readout timings of the still picture signals based on the length of a still picture exposure period for accumulating the still picture signals and the length of a motion picture frame cycle period which is the period of the frame cycles.

While the present invention has been described based on the embodiment, arbitrary combinations of the respective constituent elements and processing processes are also effective as an aspect of the present invention when applied as a computer program product, and the like. Here, a computer program product means a recording medium, a device, an apparatus, and a system in which program codes are included, such as a recording medium having program codes recorded therein (for example, DVD media, hard disk media, memory media, and the like), a computer having program codes recorded therein, an Internet system having program codes recorded therein (for example, a system including a server and a client terminal). In this case, the respective constituent elements and processing processes are implemented with respective modules, and program codes including the implemented modules are recorded in the computer program product.

A computer program product according to an aspect of the present invention may be a computer program product which includes a module that reads still picture signals from first charge storage units among a plurality of charge storage units provided in the pixels disposed on an imaging device and reads motion picture signals from second charge storage units among the plurality of charge storage units, and a module that performs control so that motion picture signals are read from the second charge storage units at timings earlier or later than a readout period of the still picture signals when the still picture signals are read from the first charge storage units in a manner such that the reading is performed n times (where n is an integer of 2 or more).

A computer program product according to an aspect of the present invention may be a computer program product which includes a module that reads still picture signals from first charge storage units among a plurality of charge storage units provided in the pixels disposed on an imaging device and reads motion picture signals from second charge storage units among the plurality of charge storage units, and a module that performs control so that motion picture exposure is performed in a period where the still picture signals are read from the first charge storage units in a manner such that the reading is performed n times (where n is an integer of 2 or more).

An entirety or a part of the functions of each unit of the imaging apparatus according to the present embodiment may be realized by recording a program for realizing these functions in a computer-readable recording medium and allowing a computer system to read and execute the program recorded in the recording medium. The "computer system" used herein includes a hardware component such as an OS or a peripheral device.

Moreover, the "computer-readable recording medium" means a storage unit such as a portable media (for example, a flexible disk, an optomagnetic disk, a ROM, and a CD-ROM), or a hard disk included in a computer system. Furthermore, the "computer-readable recording medium" may include a communication line which dynamically holds a program for a short period of time when transmitting the program via a network such as the Internet or a communication circuit such as a telephone circuit and an internal volatile memory of a computer system which serves as a server or a client in the above case and which holds the program for a predetermined period of time. In addition, the program may realize a part of the functions and may realize the functions through collaboration with a program which is already recorded in a computer system.

While the embodiment of the present invention has been described in detail with reference to the drawings, specific configurations thereof are not limited to the embodiment, and modifications can be made within a range without departing from the spirit of the present invention.

Therefore, the scope of the present invention should be determined not with reference to the above description but should, instead, be determined with reference to the appended claims, along with their full range of equivalents. Any feature described herein, whether preferred or not, may be combined with any other feature described herein, whether preferred or not. In the claims, the number of respective constituent elements is one or more, except where expressly stated otherwise. The appended claims are not to be interpreted as including means-plus-function limitations, unless such a limitation is explicitly recited in a given claim using the phrase "means for."

The invention claimed is:

1. An imaging apparatus, comprising:
a readout unit that reads still picture signals from first pixels among a plurality of pixels disposed on an imaging device and reads motion picture signals from second pixels among the plurality of pixels at predetermined frame cycles; and
a readout control unit that controls the readout timings of the still picture signals based on the length of a still picture exposure period for accumulating the still picture signals and the length of a motion picture frame cycle period which is the period of the frame cycles;
wherein when the length of the still picture exposure period is not an integer multiple of the length of the motion picture frame cycle period, the readout control unit performs a first readout control process of setting a standby period at the end of the still picture exposure period, which continues until the reading of the still picture signals starts, and starting the reading of the still picture signals after the passage of the standby period.

2. The imaging apparatus according to claim 1, wherein when the length of the still picture exposure period is defined as T1 and the length of the motion picture frame cycle period as T2, and a relationship of $(n-1) \times T2 < T1 < n \times T2$ (where n is an integer of 1 or more) is satisfied, the readout control unit controls the standby period so as to be $n \times T2 - T1$.

* * * * *